United States Patent
Battey et al.

(10) Patent No.: US 6,963,689 B2
(45) Date of Patent: Nov. 8, 2005

(54) FIBER MANAGEMENT FRAME FOR SECURELY RETAINING OPTICAL FIBER CONNECTION TRAYS

(75) Inventors: Jennifer A. Battey, Euless, TX (US); Steve A. Fontaine, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/890,008

(22) Filed: Jul. 13, 2004

(65) Prior Publication Data

US 2004/0252960 A1 Dec. 16, 2004

Related U.S. Application Data

(62) Division of application No. 09/834,294, filed on Apr. 12, 2001, now Pat. No. 6,798,967.

(51) Int. Cl.[7] .............................................. G02B 6/00
(52) U.S. Cl. ................................................... 385/135
(58) Field of Search ................................. 385/135, 134

(56) References Cited

U.S. PATENT DOCUMENTS

| | | | | |
|---|---|---|---|---|
| 4,441,831 A | * | 4/1984 | Tipple et al. ............. | 400/134.3 |
| 5,495,549 A | | 2/1996 | Schneider et al. .......... | 385/135 |
| 5,546,495 A | | 8/1996 | Bruckner et al. ........... | 385/135 |
| 5,652,820 A | | 7/1997 | Glaser et al. ............... | 385/135 |
| 5,754,723 A | | 5/1998 | Fremgen ..................... | 385/135 |
| 6,190,793 B1 | | 2/2001 | Barton et al. ................ | 429/34 |
| 6,275,640 B1 | | 8/2001 | Hunsinger et al. .......... | 385/135 |
| 6,411,767 B1 | * | 6/2002 | Burrous et al. ............. | 385/135 |
| 6,483,977 B2 | | 11/2002 | Battey et al. ............... | 385/135 |
| 6,493,501 B2 | | 12/2002 | Flores et al. ................ | 385/135 |

OTHER PUBLICATIONS

A video game management frame in Toys R Us store.*

* cited by examiner

Primary Examiner—Hae Moon Hyeon
(74) Attorney, Agent, or Firm—Christopher C. Dremann

(57) ABSTRACT

A fiber management frame and an interconnection closure including the fiber management frame are provided for securely retaining optical fiber connection trays once the closure is placed into service, while also permitting access to any of the trays to reconfigure the connections of the optical fibers without disturbing the remaining trays. The fiber management frame includes a support for holding at least one such tray selected from the group consisting of a splice tray, a coupler tray, and a connector panel. The fiber management frame may also include a bias member, such as one or more tension members, for urging each tray toward the support. As such, the bias member releasably secures each tray to the support. The fiber management frame may also include at least one adjustable member, such as an upstanding bracket, that cooperates with the support to define a space for housing at least one tray.

11 Claims, 5 Drawing Sheets

FIBER MANAGEMENT FRAME FOR SECURELY RETAINING OPTICAL FIBER CONNECTION TRAYS

This application is a divisional of U.S. patent application Ser. No. 09/834,294, filed on Apr. 12, 2001, now U.S. Pat. No. 6,798,967.

FIELD OF THE INVENTION

The present invention relates generally to interconnection closures and, more particularly, to interconnection closures having a fiber management frame for securely retaining different numbers and various sizes of optical fiber connection trays within the closure.

BACKGROUND OF THE INVENTION

Fiber optic networks typically include interconnection closures at various splice locations throughout the fiber optic network. Typically, these interconnection closures include splice closures, patch closures, and the like. For example, splice closures commonly house the splices required to interconnect the optical fibers of one or more fiber optic feeder cables to respective ones of the optical fibers of one or more fiber optic drop cables. By housing the splices, a splice closure protects the spliced end portions of the optical fibers from environmental degradation, strain and other deleterious forces, thereby increasing the reliability and quality of the splices.

While fiber optic networks have traditionally served as the backbone or trunkline of communication networks to transmit signals over relatively long distances, fiber optic networks are gradually being extended closer to the end points of the communications networks. In this regard, fiber optic networks have been developed that deliver fiber-to-the-curb, fiber-to-the-home, fiber-to-the-business, fiber-to-the-desk, and the like. In each of these different types of applications, a splice closure must be capable of splicing different types of cables to establish the proper interconnections. In this regard, the splice closure utilized in a fiber-to-the-home, fiber-to-the-business, or fiber-to-the-desk application is mounted upon a fiber optic feeder cable and one or more fiber optic drop cables to permit at least some of the optical fibers of the feeder cable to extend uninterrupted through the splice closure while splicing or otherwise connecting other optical fibers of the fiber optic feeder cable with optical fibers of a drop cable. In contrast, a splice closure that is utilized in a fiber-to-the-curb application is mounted upon not just a fiber optic feeder cable and one or more drop cables, but also an electrical feeder cable. In this application, the splice closure must facilitate the splicing of one or more electrical conductors of the electrical feeder cable to corresponding electrical conductors of the drop cable, while permitting the remainder of the electrical conductors to extend uninterrupted through the closure. Additionally, the splice closure must facilitate the splicing of one or more of the optical fibers of the fiber optic feeder cable with respective optical fibers of the drop cable while continuing to permit at least some of the optical fibers of the fiber optic feeder cable to extend uninterrupted through the splice closure.

In either type of splice closure, the splice closure must provide a mechanism for connecting optical fibers, such as splicing one or more optical fibers of a fiber optic feeder cable with respective optical fibers of a drop cable. Typically, the splice closure includes one or more splice trays, coupler trays, and/or connector panels that facilitate the splicing or other connection of respective pairs of the optical fibers. For ease of reference, splice trays, coupler trays, and connector panels will be hereinafter referred to as "optical fiber connection trays" or simply "trays." Each such tray is designed to house a plurality of connections between respective pairs of optical fibers. Since many splice closures include a large number of connections between respective pairs of optical fibers, splice closures oftentimes include a plurality of trays, typically stacked one upon another.

The trays are preferably secured within the splice closure such that the trays are fixed in position once the splice closure has been configured and is placed into service. As such, the trays should not shift or otherwise move once the splice closure has been placed into service since any shifting or other movement of the trays could harm the connections between respective pairs of optical fibers. Some splice closures include a strap, such as a hook and loop strap, that wraps about the trays to secure the trays in position. Alternatively, the trays may define an aperture and the splice closure may include a post upon which the trays are mounted such that the post extends through the corresponding apertures defined by the trays, thereby securing the trays in position.

While the trays are desirably fixed in position once the splice closure has been configured and placed in service, the splice closure is also preferably designed such that the trays can be readily accessed by technicians both during the initial configuration of the splice closure in which connections are established between respective pairs of the optical fibers and during any subsequent reconfiguration of the splice closure in which at least some of the connections between respective pairs of the optical fibers are changed. For splice closures that include a strap for retaining the trays, the strap must be released to access the trays, such as during reconfiguration of the splice closure. Upon removing the strap, however, the trays tend to slide relative to one another and to fan out so as to no longer be stacked one upon another. For example, the optical fibers that enter and exit the trays are typically disposed in transport tubes and buffer tubes. These tubes are stiffer than the optical fibers and may impose various forces upon the trays due to the manner in which the tubes have been bent during routing. Once the strap has been released, the forces imparted by the tubes will therefore generally cause the trays to slide relative to one another. Once a technician has appropriately reconfigured the splice closure, such as by reconfiguring the connections housed by one or more trays, the technician must restack the trays and refasten the strap, thereby creating additional work for the technician. Moreover, the movement of most, if not all, of the trays can also cause inadvertent damage to the connections between respective pairs of the optical fibers.

As will also be apparent, splice closures that include a plurality of trays mounted upon an upstanding post require the uppermost trays be removed to access the lower trays. Not only does the removal of the uppermost trays create additional work for the technician responsible for reconfiguring the splice closure, but the removal of the uppermost trays increases the risk that the connections housed by the uppermost trays will be damaged during the reconfiguration process. As such, it would be desirable for a splice closure to permit access to any one of the trays without having to move or otherwise handle any of the remaining trays.

The trays have a variety of sizes in terms of length, width and thickness. Thus, the compartment of the splice closure designed to receive the trays must be sufficiently large to receive trays having any of the various sizes that may be utilized. Since the compartment is thus generally oversized relative to the trays, splice closures that include straps or the like for retaining the splice trays might still permit some unintended movement of the trays. In this regard, the straps generally extend in a widthwise direction around the trays. As such, the trays can still move in a lengthwise direction since the compartment in which the trays are disposed may be longer than the trays. This unintended lengthwise movement of the trays can also harm the connections between respective pairs of the optical fibers.

Accordingly, while splice closures having one or more trays have been developed, it would be desirable to develop a splice closure that further protects the connections housed by the trays once the splice closure has been configured and placed in service. As such, it would be desirable to develop a splice closure that more securely retains the trays in a fixed position once the trays have been configured and the splice closure has been placed in service. Additionally, it would be desirable to develop a splice closure that permits the technician to more readily access any one of the trays without having to move or otherwise reposition the remaining trays.

SUMMARY OF THE INVENTION

A fiber management frame and an interconnection closure including the fiber management frame are provided for securely retaining optical fiber connection trays once the splice closure has been placed in service, while also permitting ready access to any one of the trays to reconfigure the connections housed by the respective tray without moving or otherwise repositioning the remaining trays. Accordingly, the fiber management frame and the associated interconnection closure of the present invention protect the connections housed by the trays from inadvertent damage otherwise possibly occasioned by unintended movement of the trays.

According to one aspect of the present invention, a fiber management frame is provided that includes a support for holding at least one optical fiber connection tray selected from the group consisting of a splice tray, a coupler tray, and a connector panel, and a bias member for urging each such tray toward the support. As such, the bias member releasably secures each tray within the fiber management frame. The bias member preferably includes at least one tension member extending toward the support, thereby typically defining an acute angle with respect to the support. The tension member is capable of exerting a force having a component directed toward the support to secure each tray within the fiber management frame. Typically, each tension member extends from a first end that is remote from the support to a second end that is proximate the support. In order to facilitate lifting of a tension member in order to insert a tray, the second end of the tension member preferably includes an upturned lip that can be readily engaged by a technician. In a further embodiment, the bias member is formed by a pair of tension members that are spaced apart from one another. To facilitate movement of the pair of tension members in tandem, the tension members may be interconnected by a handle.

The support is preferably capable of holding any number of trays from a single tray up to a predetermined maximum number of trays. Regardless of the number of trays, the tension member is sized such that the tension member contacts the tray furthest removed from the support without protruding beyond the support. Thus, the tension member does not obstruct placement of the fiber management frame in the housing of the closure.

Regardless of the number of trays stacked upon the support, the bias member imparts a force upon each of the trays that urges the trays toward the support, thereby securing the trays in position between the bias member and the support. Since the bias member generally contacts the tray that is furthest removed from the support and does not otherwise extend about the trays, any tray, including a tray in the middle of the stack or a tray on the bottom of the stack, can be removed without having to move or otherwise reposition the upper trays. Thus, the connections housed by any of the trays can be reconfigured without having to remove the overlying trays. Moreover, the bias member can continue to impart a force to the trays that urges the trays toward the support even as one or more trays are being removed, thereby effectively preventing the type of undesirable movement of the trays relative to the fiber management frame or relative to one another that typically results upon the release of a strap of a conventional closure. Thus, the fiber management frame of this aspect of the present invention further protects the connections between respective pairs of the optical fibers by limiting undesired movement of the trays while facilitating reconfiguration of the connections housed by any one of the trays.

According to another aspect of the present invention, a fiber management frame is provided that includes a support and at least one adjustable member cooperating with the support to define a space for housing at least one tray selected from a group consisting of a splice tray, a coupler tray, and a connector panel. According to this aspect of the present invention, the at least one adjustable member is capable of being repositioned relative to the support so as to correspondingly resize the space. The space can therefore be resized to snugly receive trays having various sizes, thereby further preventing undesirable movement of the trays.

Preferably, the support defines a track and the at least one adjustable member is formed by at least one upstanding bracket that engages the track and slidably moves therealong so as to be repositioned relative to the support. For example, the support may define a slot that serves as the track. As such, the upstanding bracket extends through the slot and engages the support so as to be slidably moveable along the length of the slot. In one advantageous embodiment, the fiber management frame includes a pair of brackets adapted to be slidably moved relative to one another such that the space between the brackets in which trays will be disposed can be customized to match the size or desired position of the trays on the support. In this embodiment, the support typically defines a pair of lengthwise extending tracks. The tracks are parallel and are spaced apart in a lengthwise direction. As such, each bracket slidably moves along a respective track, for example, to move toward and away from one another.

The fiber management frame may also include a locking member for securing the pair of brackets in position once the desired position or space between the brackets has been sized to snugly receive the trays. In this regard, each bracket may include an arm that overlaps with the arm of the other bracket. The locking member may also include a fastener that engages the respective arms of the pair of brackets to secure the brackets in position.

By including at least one and, more typically, a pair of adjustable members, such as a pair of upstanding brackets, the fiber management frame may be configured to snugly receive various sizes of trays. Thus, the fiber management frame of this aspect of the present invention can further reduce the movement of the trays once the splice closure has been configured and placed into service. The fiber management frame of this aspect of the present invention can therefore further protect the connections housed by the tray from inadvertent damage attributable to unintended movement of the trays relative to one another and relative to other portions of the fiber management frame.

In addition to the various aspects of the fiber management frame described above, interconnection closures are also provided including respective fiber management frames. For example, an interconnection closure may include a fiber management frame having a bias member for releasably securing at least one tray in position and/or at least one adjustable member for defining the space in which trays will be housed. In addition to the fiber management frame, the interconnection closure includes a housing defining an internal cavity in which the fiber management frame is disposed. The housing of the interconnection closure also defines a plurality of ports opening into the internal cavity for receiving a plurality of cables. As described above in conjunction with the fiber management frame, the interconnection closure protects the connections housed by the trays from inadvertent damage while facilitating access by a technician, such as during reconfiguration of the closure, by preventing the undesirable movement of the trays once the closure has been appropriately configured and placed into service.

BRIEF DESCRIPTION OF THE DRAWINGS

Figure 1:
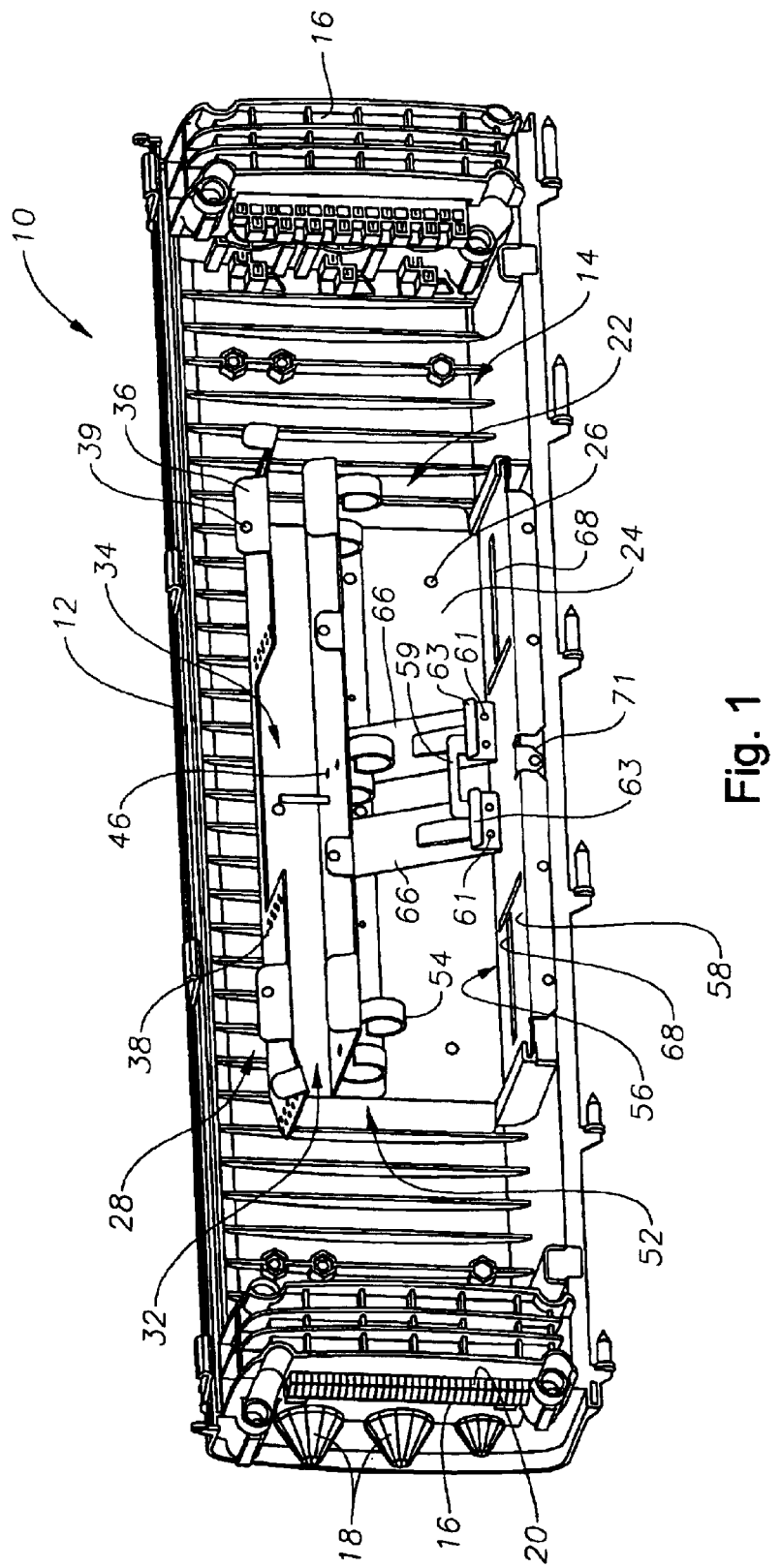
Figure 2:
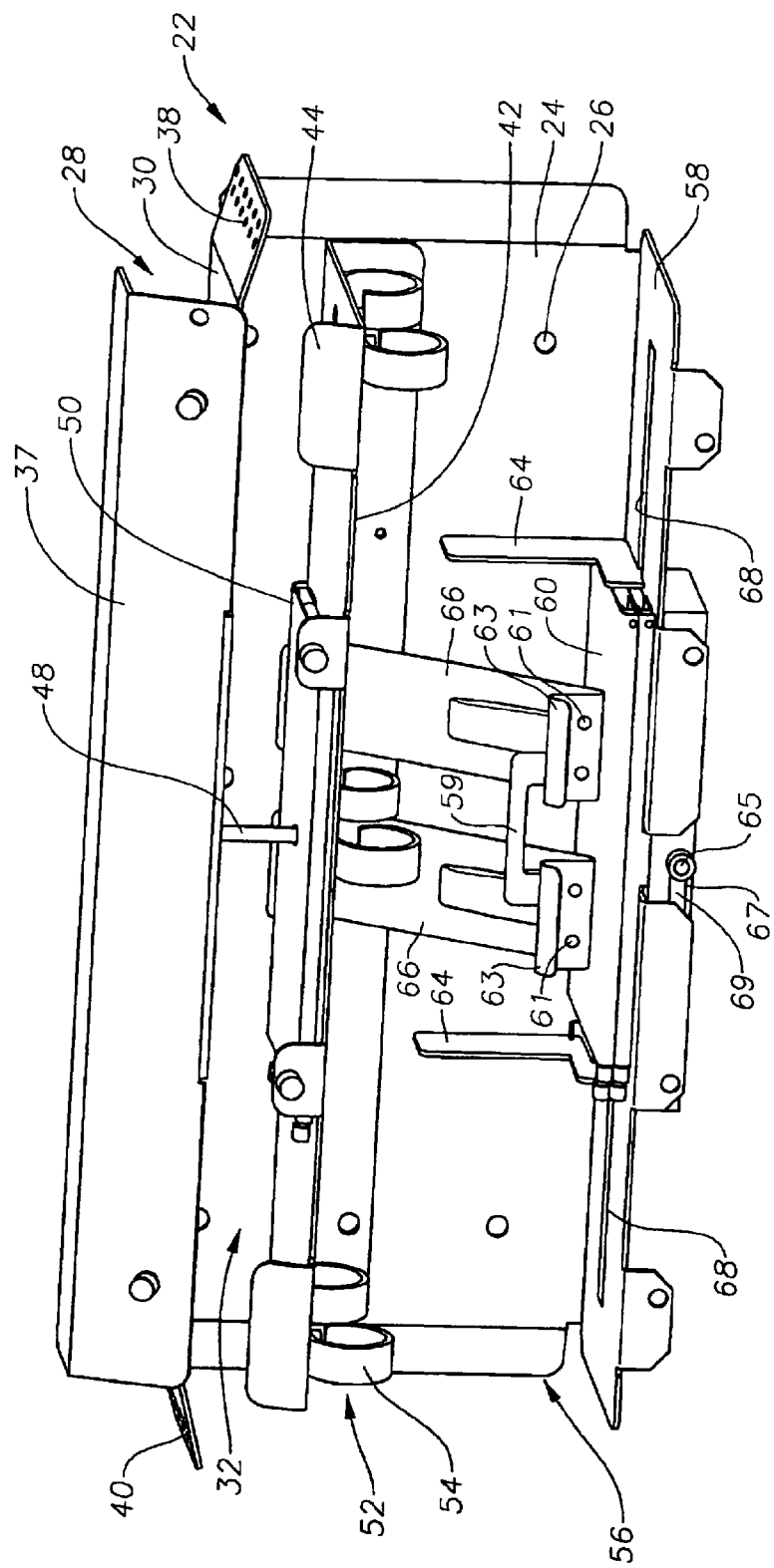
Figure 3:
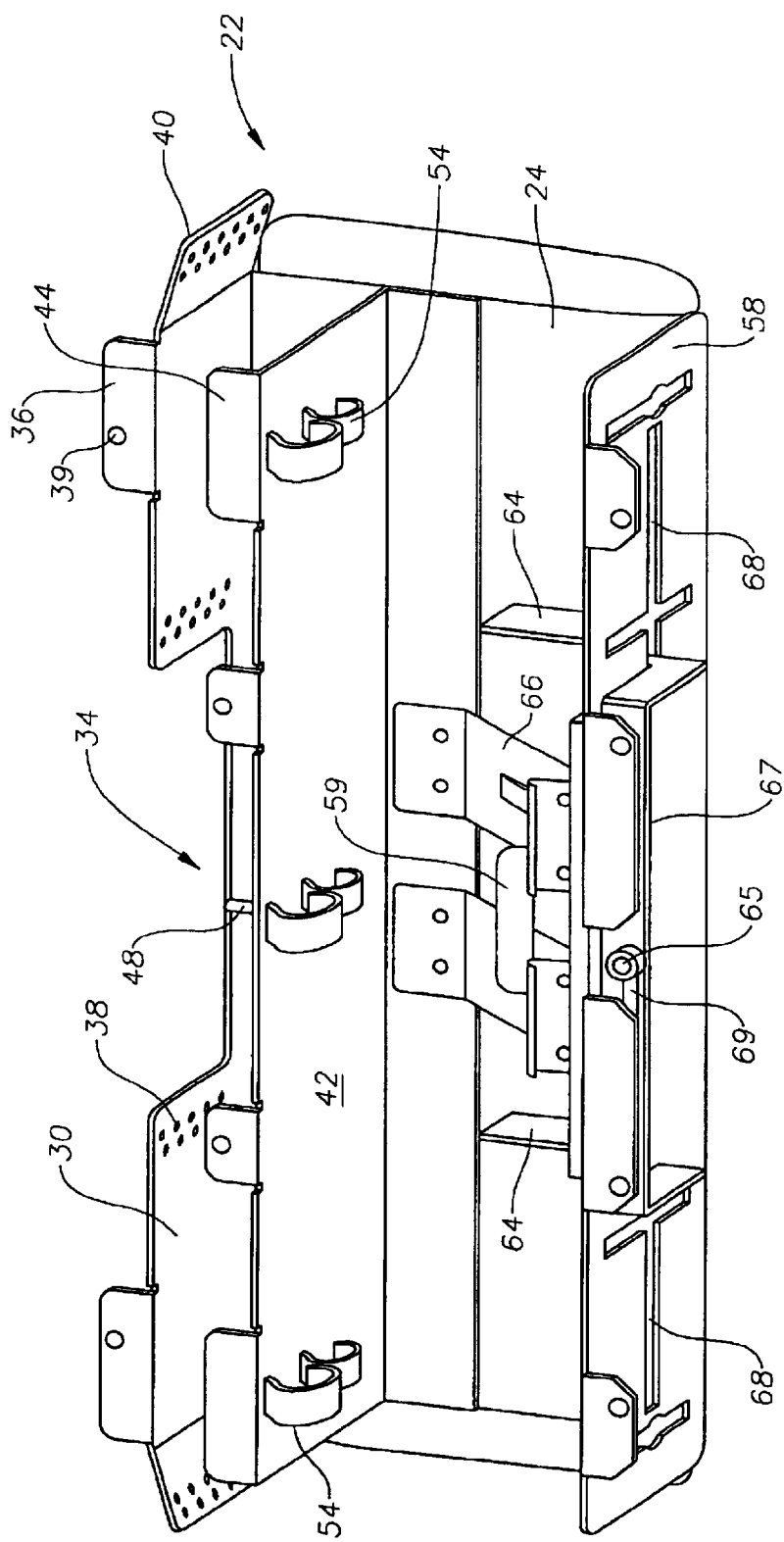
Figure 4:
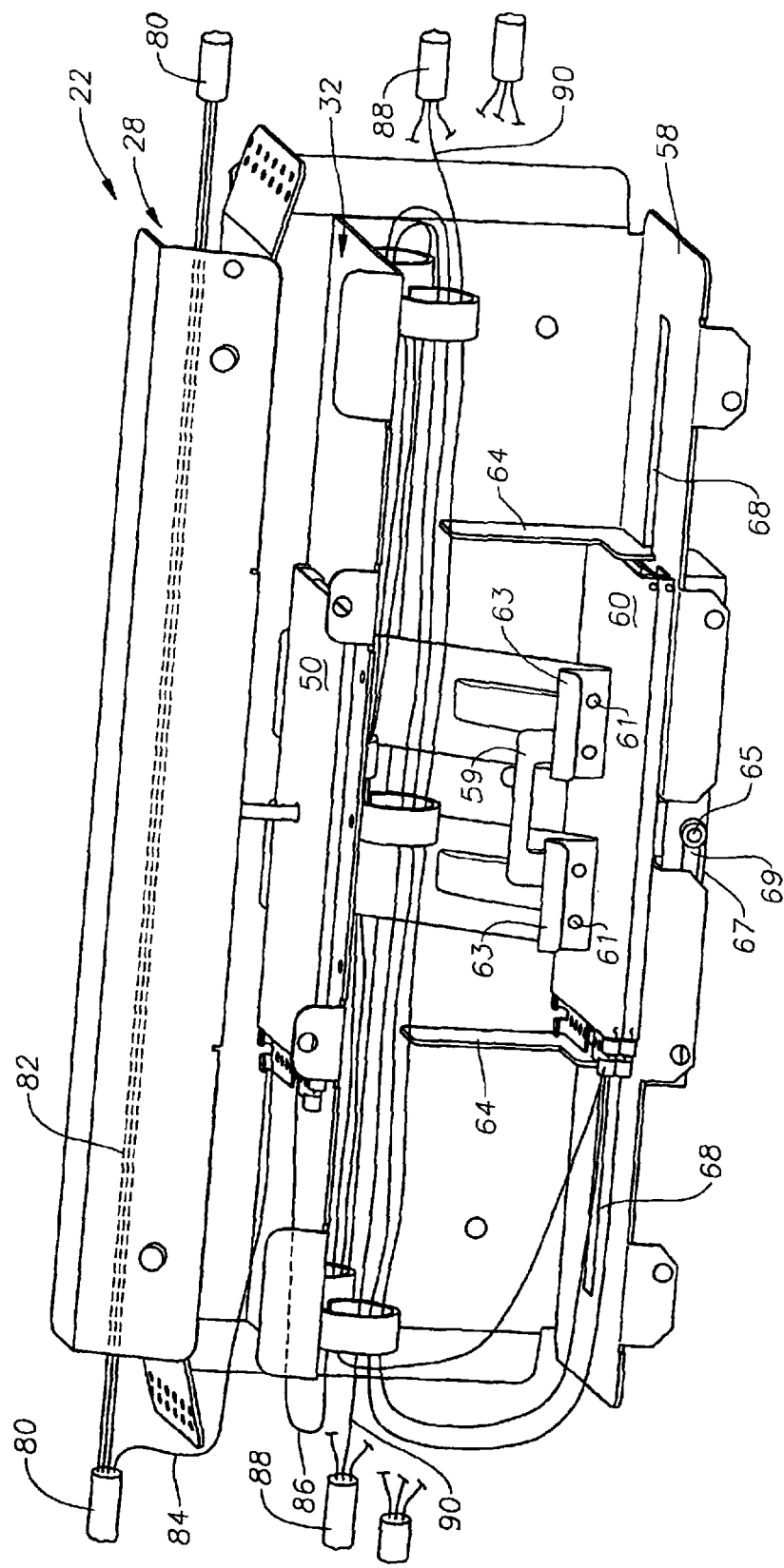
Figure 5:
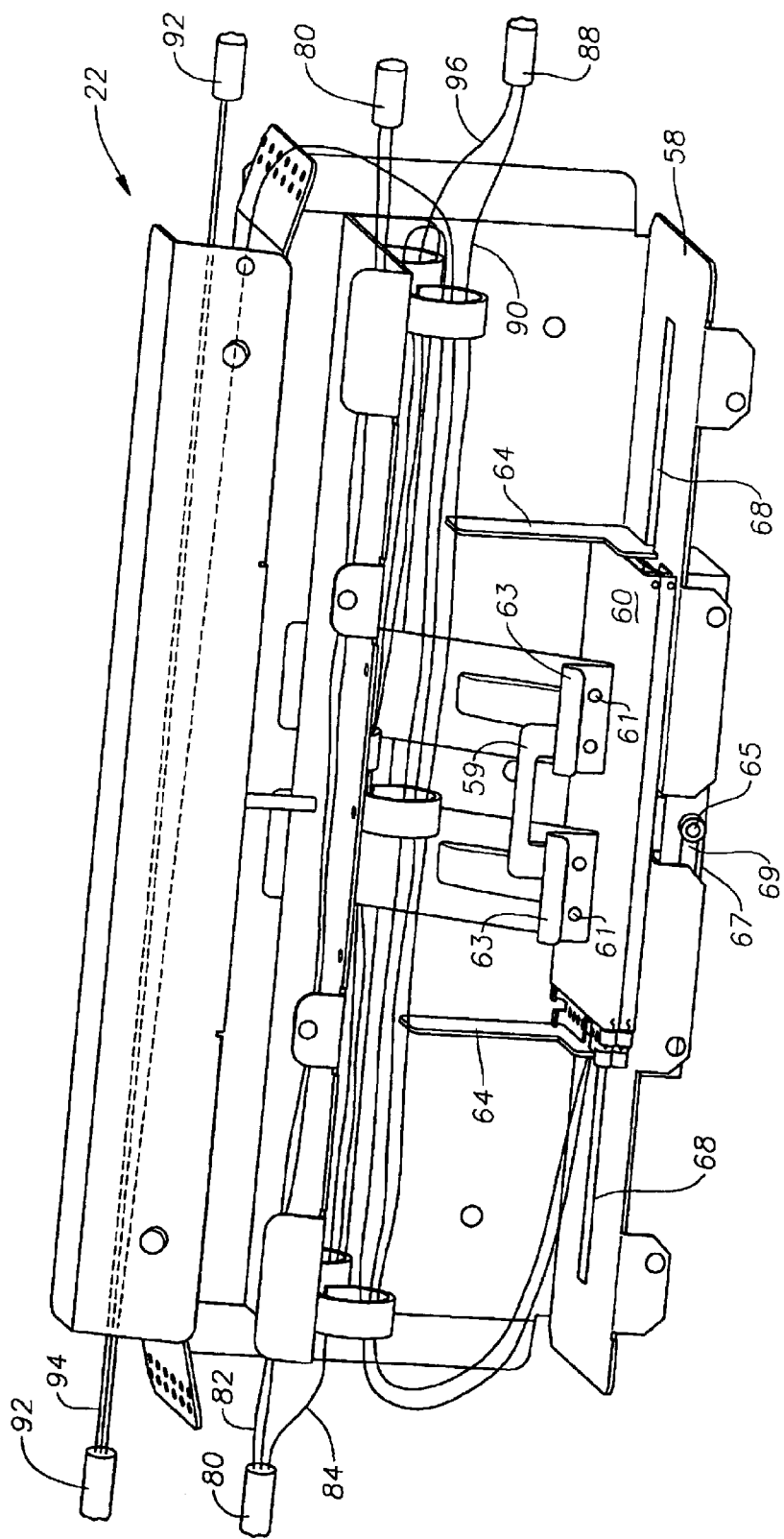

Having thus described the invention in general terms, reference will now be made to the accompanying drawings, which are not necessarily drawn to scale, and wherein:

FIG. 1 is a perspective view of an interconnection closure including a fiber management frame according to one embodiment of the present invention in which a portion of the housing of the interconnection closure has been removed to show the interior cavity defined by the interconnection closure and the fiber management frame disposed therein, and in which the adjustable brackets have been removed for purposes of clarity;

FIG. 2 is a perspective view of a fiber management frame according to one embodiment of the present invention which includes a coupler tray and a relatively short splice tray in separate compartments thereof;

FIG. 3 is another perspective view of a fiber management frame according to one embodiment of the present invention which includes a relatively long splice tray and which depicts the underneath side of the fiber management frame including the overlapping arms of the adjustable brackets;

FIG. 4 is a perspective view of the fiber management frame of FIG. 2 depicting the routing of the express optical fibers and the optical fibers of the drop cables in a fiber-to-the-home, fiber-to-the-business, or fiber-to-the-desk application; and FIG. 5 is a perspective view of the fiber management frame of FIG. 2 depicting the routing of the express electrical conductors, the express optical fibers and the optical fibers and electrical conductors of the drop cables in a fiber-to-the-curb application.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, the preferred embodiments are provided so that this disclosure will be thorough and complete, and will fully convey the scope of the invention to those skilled in the art. Like numbers refer to like elements throughout.

Referring now to FIG. 1, an optical fiber interconnection closure 10 according to one advantageous embodiment of the present invention is illustrated. The closure may be a splice closure, a patch closure or the like. Moreover, the closure may be installed in an aerial location, buried, disposed in an enclosure or otherwise sealed. For purposes of example and not of limitation, however, the interconnection closure will be hereinafter described as an aerial splice closure. Although the closure of the illustrated embodiment is an in-line closure, the closure of the present invention may have other configurations, such as a canister or "butt" type closure, without departing from the spirit and the scope of the present invention.

As illustrated, the closure 10 includes a housing 12 defining an internal cavity 14. While the housing may have a variety of shapes, the housing of the illustrated embodiment is generally tubular with a substantially rectangular shape in lateral cross-section. The housing extends lengthwise between a pair of opposed, open ends. The closure also generally includes a pair of end caps 16 disposed within respective ones of the open ends of the housing and secured to the housing, such as by means of an annular collar or other fasteners known to those skilled in the art. While the housing and the end cap may be formed of a variety of materials, the housing and the end caps of one advantageous embodiment are molded of a rigid plastic material.

As known to those skilled in the art and as shown in FIG. 1, the end caps 16 of a splice closure 10 generally define a plurality of ports for receiving respective cables. The ports defined by the end caps may receive a fiber optic feeder cable that extends through the splice closure and the end portions of one or more fiber optic drop cables. While the end caps may define a number of different types of ports, the end caps of the illustrated embodiment include conical-shaped ports 18 for receiving and securely engaging a fiber optic feeder cable, an electrical feeder cable, and the like, and a seam 20 defined by a plurality of opposed, flexible fingers through which one or more drop cables extend. As such, in a fiber-to-the-home, fiber-to-the-business, or fiber-to-the-desk application, one or more of the optical fibers of a fiber optic feeder cable can be spliced to respective optical fibers of the fiber optic drop cables within the closure, while the remaining optical fibers of the fiber optic feeder cable can extend uninterrupted through the closure. Additionally, in a fiber-to-the-curb application, the end caps define ports for receiving an electrical feeder cable. Thus, one or more of the electrical conductors of the electrical feeder cable can also be spliced to corresponding electrical conductors of the drop cables, while the remaining electrical conductors of the electrical feeder cable extend uninterrupted through the closure. Accordingly, the drop cables in a fiber-to-the-curb application are typically composite cables that include both electrical conductors and optical fibers, as described further below. As will be apparent to those skilled in the art, however, the closure and, more particularly, the end caps may be configured to receive and interconnect other combinations of fiber optic and/or electrical cables, if so desired.

In addition to receiving a variety of different types of cables, the closure 10 may organize and interconnect different types of optical fibers, such as loose buffered optical fibers and ribbon fiber. As such, the term "optical fiber" as used herein is intended to include all types of optical fibers, including loose buffered optical fibers, optical fibers in the form of a multifiber ribbon, individual optical fibers, or any other subunit of a fiber optic cable. Additionally, the optical fiber may have various diameters including diameters of 900 micron, 2 mm and 3 mm.

The closure 10 of the present invention also includes a fiber management frame 22 disposed within the internal cavity 14, as depicted in FIG. 1. The fiber management frame of the illustrated embodiment includes a back panel 24 that is attached to the housing 12, such as by means of a plurality of bolts or other types of fasteners, that extend through corresponding apertures 26 defined by the back panel of the fiber management frame and engage the housing. As depicted, the fiber management frame may be mounted within a medial portion of the housing. However, the fiber management frame may, instead, be mounted closer to either end of the housing, if so desired. Additionally, while the fiber management frame is depicted to extend lengthwise for about one-half of the length of the housing, the fiber management frame may be either larger or smaller depending upon the size of the housing and the requirements of the particular application. Typically, the fiber management frame is formed of a metal, such as aluminum, although the fiber management frame may be made of other rigid materials, including plastic, if so desired.

The fiber management frame 22 includes a support 58 for holding one or more optical fiber connection trays, such as splice trays, coupler trays, and/or connector panels (hereinafter generically and collectively referred to as "optical fiber connection trays" or simply "trays"). Although not necessary for the practice of the present invention, the fiber management frame of the illustrated embodiment includes a number partitions, one of which serves as the support. As such, the fiber management frame of the present invention will be described in conjunction with the embodiment having a number of partitions, even though the fiber management frame may have a number of other configurations, if so desired. In the illustrated embodiment, however, the partitions define a plurality of compartments, such as four compartments, each of which extends in a lengthwise direction so as to be in-line relative to the optical fibers and, in some instances, the electrical conductors that extend through the closure 10.

In the illustrated embodiment, the fiber management frame 22 includes first, second, third and fourth compartments that extend side-by-side in a parallel fashion. The first compartment 28 includes a partition 30 that extends both outwardly from the back panel 24 and lengthwise through the closure 10. The partition 30 separates the first compartment 28 from the second compartment 32. However, the partition defines an opening or a cutout 34 to facilitate access to the second compartment as described below. The first compartment extends lengthwise from a first open end to a second open end. Thus, optical fibers or electrical conductors may extend lengthwise through the first compartment as separately described below in conjunction with fiber-to-the-home and fiber-to-the-curb applications.

To retain the optical fibers or the electrical conductors within the first compartment 28, the first compartment may also include at least one and, more typically, a plurality of upturned flanges 36 spaced lengthwise along the outer edge of the partition 30 opposite the back panel 24. Additionally, the first compartment may include a cover 37 for protecting the optical fibers or electrical conductors extending through the first compartment. Preferably, the cover is removable. In the embodiment depicted in FIG. 2, for example, the cover may be attached by means of a bolt or other type of fastener to the upturned flanges and, in particular to holes 39 defined by the upturned flanges. Thus, the cover can be removed while the closure 10 is being configured to provide access to the first compartment. Conversely, the cover may be installed following the configuration of the closure to protect the optical fibers or electrical conductors.

Additionally, the partition 30 may define a plurality of holes 38 for receiving tie wraps or other types of fasteners. As such, the tie wraps or other types of fasteners may be wrapped about the optical fibers or the electrical conductors and may extend through at least a pair of the holes defined by the partition in order to secure the optical fibers or the electrical conductors to the partition. As depicted, the partition may define holes at various locations, including at locations proximate the opposed open ends of the first compartment 28.

In one embodiment, the first compartment 28 also includes an angled ramp 40 projecting outwardly from at least one end and, more typically, both ends, of the partition 30. As depicted, the angled ramp generally slopes slightly downwardly towards the second compartment 32 so as to assist in guiding the optical fibers or the electrical conductors from a respective port and into the first compartment. As also shown, the angled ramp may define a plurality of the holes 38 through which the wraps or other types of fasteners may extend in order to secure the optical fibers or the electrical conductors, to the partition.

The second compartment 32 of the illustrated embodiment also includes a partition 42 extending both outwardly from the back panel 24 and in a lengthwise direction. As depicted, the partition of the second compartment is spaced somewhat from the partition 30 of the first compartment 28 in order to define the second compartment therebetween. The second compartment also extends in a lengthwise direction from a first end to a second end. Typically, each end is open for receiving optical fibers. However, in fiber-to-the-home applications, optical fibers typically only pass through the first end of the second compartment such that only the first end need be open. To permit the fiber management frame 22 to be used universally in both fiber-to-the-home and fiber-to-the-curb applications, however, the fiber management frame is preferably designed such that both the first and second ends of the second compartment are open for receiving optical fibers.

Like the first compartment 28, the second compartment 32 also preferably includes at least one and, more typically, a plurality of upturned flanges 44 spaced lengthwise along the edge of the partition 42 opposite the back panel 24 for retaining the optical fibers within the second compartment. Moreover, the partition of the second compartment may define a plurality of holes 46 for receiving tie wraps or other types of fasteners in order to secure the optical fibers to the partition of the second compartment as described above in connection with the first compartment. As described in more detail below in connection with the fiber-to-the-home application, the second compartment may also include an engagement member 48, such as an upstanding peg, for engaging at least one optical fiber connection tray, such as a coupler tray 50, that may be stored in the second compartment.

The third compartment 52 of the illustrated embodiment is proximate the second compartment 32 and also extends in a lengthwise direction from a first open end to a second open end. Thus, the third compartment may receive optical fibers, such as the optical fibers of a drop cable, through both the first and second ends. The third compartment is designed to store slack lengths of optical fibers, including the optical fibers of the drop cables and the optical fibers of the fiber optic feeder cable. In the illustrated embodiment, the third compartment includes a plurality of clips 54. The plurality of clips are preferably connected to the partition 42 of the second compartment. Typically, the clips are arranged in one or more lengthwise extending rows. In the illustrated embodiment, for example, the clips are disposed in two lengthwise extending rows. In addition, the clips are preferably spaced apart in a lengthwise direction to adequately support the optical fiber. The clips of the illustrated embodiment are open rings that permit optical fibers to be inserted into and removed from the rings, although the clips may have other configurations if so desired. While the third compartment of the illustrated embodiment includes a plurality of clips for retaining optical fibers that extend therethrough, the third compartment may, instead, be formed in other manners, such as by means of another partition extending both outwardly from the back panel 24 and in a lengthwise direction. In this alternative embodiment, the partition of the third compartment is spaced from the partition of the second compartment so as to define a region between the partitions of the second and third compartments through which the optical fibers may extend.

The fourth compartment 56 of the fiber management frame 22 is proximate the third compartment 52 in the illustrated embodiment. The fourth compartment also includes a partition 58 that extends both outwardly from the back panel 24 and in a lengthwise direction. Typically, the fourth compartment extends lengthwise between a first open end and a second open end. Since the optical fibers typically only enter and exit the fourth compartment from one end, however, the other end of the compartment could be closed, if so desired. In both fiber-to-the-home and fiber-to-the-curb applications, the fourth compartment is advantageously designed to store at least one tray 60 such that the optical fibers of a fiber optic feeder cable may be interconnected with corresponding optical fibers of a drop cable therewithin. As such, the partition 58 serves as the support for holding the optical fiber connection trays. By being capable of storing different types of trays, such as a splice tray, a coupler tray, and/or a connector panel, the fiber management frame of the present invention provides a common platform to reduce the number of different closures that must be manufactured and installed.

The fiber management frame 22 of the present invention includes various means for engaging the trays 60 and for preventing undesired movement of the trays once the closure 10 has been appropriately configured. As depicted in FIGS. 1–3, the fiber management frame may include a bias member for urging the trays toward the support 58. As such, the bias member may releasably secure the trays upon the support within the fiber management frame. While various types of bias members may be utilized to urge the trays toward the support, the bias member of one advantageous embodiment includes at least one and, more typically, a pair of tension members 66. Each tension member extends toward the support, typically at an acute angle with respect to the support. For example, the tension members of one embodiment extend toward the support and define an acute angle of about sixty degrees (60°) with respect to the support in the absence of trays. However, the tension members may define other acute angles with respect to the support depending upon the design of the fiber management frame. Since the tension members must be deflected or lifted in order to insert a tray, each tension member is able to exert a force upon the trays that has at least a component directed toward the support, thereby releasably securing the trays to the support.

In the illustrated embodiment, each tension member 66 extends downwardly from the partition 42 of the second compartment 32 toward the support 58. In this regard, each tension member typically extends from a first end remote from the support and connected to the partition of the second compartment in the illustrated embodiment to a second end proximate the support. However, the tension members may extend from the back panel 24 or other portions of the fiber management frame 22, if so desired. In addition, in the illustrated embodiment, the tension members urge the trays 60 downwardly against a support. Alternatively, the tension members may urge the trays upwardly against a support, or rearwardly against a support, such as the back panel 24, if so desired. The tension members are preferably positioned so as to exert forces that are substantially centered with respect to the trays. In the embodiment that includes a single tension member, the tension member is therefore preferably centered with respect to the trays. In addition, in the embodiment which includes two or more tension members, the tension members are preferably evenly spaced in a lengthwise direction and are again centered with respect to the trays as shown in FIGS. 2 and 3.

In the absence of trays 60, the nominal position of the tension members 66 is to extend downwardly so as to contact or at least be disposed closely to the support 58. In order to stack one or more trays upon the support, the tension members must therefore be lifted upwardly and the trays set upon the support. The tension members are then released so as to contact the upper surface of the uppermost tray, i.e., that surface of the uppermost tray that is furthest removed from the support. For embodiments that include two or more tension members, the fiber management frame 22 may also include a handle 59 that extends between and interconnects the tension members to facilitate lifting of the tension members to insert a tray. So that the tension members may be lifted evenly across the width of each tension member without rotation or other flexure of the tension members, the handle is preferably connected either to the midpoint of each tension member in a widthwise direction or to opposite sides of each tension member as indicated by the rivet connections 61 in FIG. 2. In the embodiment of the fiber management frame that includes only a single tension member, the fiber management frame typically does not include a handle. Instead, the tension member itself is designed to facilitate lifting of the tension member. In this regard, the second end of the tension member may include an upturned lip 63 that may be easily engaged by a technician to lift the tension member to facilitate the insertion of a tray.

The fiber management frame 22 is generally designed to receive any number of trays from a single tray to a predetermined maximum number of trays 60. Regardless of the number of trays, the tension members 66 are designed to contact the upper surface of the uppermost tray in order to secure the trays upon the support 58. Moreover, the tension members are sized such that the tension members never protrude beyond the support 58 and therefore do not obstruct or otherwise contact the housing 12. In the illustrated embodiment, for example, the tension members are sized such that even in instances in which the tension members are most greatly deflected and extend most directly outward from the back panel 24, the second end of the tension members still do not protrude beyond the support.

Moreover, the bias force that the tension members 66 are capable of exerting is partially dependent upon the angle of the tension member relative to the support 58. In this regard, the tension member will generally apply less force to a single tray 60 than to a plurality of stacked trays since the tension members will increasingly be further displaced from their nominal position as additional trays are placed upon the support. Thus, the tension members are preferably designed such that the tension members provide sufficient force to retain the splice trays within the fiber management frame when only a single tray is mounted by the support, while also ensuring that the bias force exerted by the tension members is not excessively large when multiple trays are stacked upon the support such that the tension members can still be lifted to permit the insertion of an additional tray. The tension members of one embodiment are formed of spring steel. In order to alter or tailor the bias force applied by the tension members, however, the tension members may be formed of different materials that are capable of applying the bias force, if so desired. In addition or alternatively, the tension members may be shaped differently to alter the resulting bias force. For example, while the medial portion of each tension member that extends from the first end to the second end may be planar, the medial portion may include a deformed portion or a joggle for increasing the stiffness of the tension member and correspondingly increasing the bias force.

Thus, the bias member of the fiber management frame 22 of this aspect of the present invention secures one or more trays 60 to the support 58 and therefore prevents the trays from moving once the closure 10 has been installed and placed into service. As such, the fiber management frame of this aspect of the present invention prevents damage to the connections housed by the trays that may otherwise be caused by unintended movement of the trays. However, the bias member can be readily lifted to load one or more trays during the initial configuration of the closure. In addition, the bias member permits one or more of the trays, including a tray in the middle or at the bottom of the stack, to be removed without moving or otherwise repositioning the remaining trays. Moreover, the bias member permits a tray to be removed by sliding the tray out of the stack without lifting the bias member. As such, the bias member can continue to exert a force upon the stack of trays so as to prevent unintended movement of the trays as may occur when a strap is removed from a stack of trays in a conventional closure. Accordingly, damage to the connections between respective pairs of optical fibers is further prevented by limiting unnecessary movement of the trays.

Regardless of whether the fiber management frame 22 includes a bias member, the fiber management frame may include one or more adjustable members that cooperate with the support 58 to define a space for housing one or more trays 60. In this embodiment, each adjustable member is capable of being repositioned relative to the support to correspondingly resize the space to receive various sizes of trays. For example, the adjustable members may be moved away from one another to enlarge the space so as to receive larger trays or moved towards one another to reduce the space so as to receive smaller trays. Furthermore, one of the adjustable members may be moved, or both of the adjustable members may be moved in the same direction to reposition the tray on the support. As such, the adjustable members may define the position of the trays on the support and the space between the adjustable members such that the trays will be received snugly therein, thereby further reducing the unintended movement of the trays following configuration of the closure 10 and preventing damage to the connections of respective pairs of optical fibers that may otherwise have occurred as a result of unintended movement of the trays.

In the illustrated embodiment, the support 58 defines a track. While the support may define various types of tracks, the support of one embodiment defines a lengthwise extending slot 68. As shown in FIGS. 2 and 3, the at least one adjustable member preferably includes at least one upstanding bracket 64 that engages and rides upon the track defined by the support. As such, the at least one upstanding bracket may be slidably moved along the track so as to be repositioned relative to the support. In the illustrated embodiment in which the track is a lengthwise extending slot defined by the support, the upstanding bracket extends through the slot and is adapted to be moved lengthwise therealong.

In a preferred embodiment, the fiber management frame 22 includes a pair of upstanding brackets 64 spaced apart from one another in a lengthwise direction in order to define the space for receiving trays 60 of different lengths therebetween. In this embodiment, the support 58 defines a pair of lengthwise extending slots 68 that are also spaced apart from one another in a lengthwise direction. However, the slots typically extend parallel and, more typically, collinear with one another. Thus, each upstanding bracket preferably rides within a respective slot so as to be moved toward and away from one another in order to reduce and enlarge the size of the space therebetween, respectively. While the fiber management frame typically includes brackets as described above and as illustrated in FIGS. 2 and 3, the brackets may be positioned differently within the fiber management frame, if so desired. For example, a bracket may be mounted to the support so as to move toward and away from the back panel 24 in order to define a space for snugly receiving trays having different widths.

While the brackets 64 may have a variety of different shapes without departing from the spirit and scope of the present invention, the brackets of the illustrated embodiment generally have an L-shape. In this regard, the base portion of each L-shaped bracket extends across and rides upon the surface of the support 58, while the upstanding portion of each bracket extends upwardly from the base portion for engaging end portions of trays 60 stacked within the space between the pair of brackets. To prevent unintended movement of the trays in the lengthwise direction, the brackets are preferably spaced apart from one another by a distance substantially equal to the length of the trays that will be carried by the support. As such, the brackets define a space that will snugly receive the trays and prevent unintended lengthwise movement of the trays, thereby further preventing damage to the connections of respective pairs of optical fibers housed by the trays.

The fiber management frame 22 also preferably includes a locking member 65 for securing the pair of brackets 64 in position once the space has been appropriately sized. While various techniques for securing the pair of brackets in position may be utilized, the brackets of the illustrated embodiment each include an arm 67 extending in a lengthwise direction and disposed on the opposite side of the support 58 from the trays 60. In this regard, the brackets are formed such that the arms of each bracket extend lengthwise alongside one another. Each arm also preferably defines a lengthwise extending slot 69. Thus, the locking member may include a fastener that extends through slots defined by the respective arms of the pair of brackets. In the illustrated embodiment, the support also includes a downturned flange 71 (FIG. 1) that defines an aperture through which the fastener may extend. Thus, the relative positions of the brackets can be fixed with respect to the fiber management frame. However, the locking member can readily be removed and the brackets moved inwardly or outwardly relative to one another to decrease or increase, respectively, the size of the space in which trays are stacked, if so desired. Thus, the fiber management frame of this aspect of the present invention further restricts the unintended movement of the trays following the configuration of the closure 10 so as to reduce the possibility of damage to the connections of respective pairs of optical fibers otherwise caused by the unintended movement of the trays.

While a fiber management frame 22 of one advantageous embodiment has been illustrated and described, the fiber management frame may have other configurations, if so desired. For example, the various compartments may have different heights and widths. Additionally, the compartments may be oriented differently with the fourth compartment 56 being the topmost compartment and the first compartment 28 being the lowermost compartment. However, the fiber management frame preferably defines the compartments to be in-line with the cables to facilitate the routing of the optical fibers and, in fiber-to-the-curb applications, electrical conductors. In order to facilitate the splicing of the optical fibers within the trays 60, the fiber management frame 22 may also include a splicing platform for holding a splice tray during splicing operations as described by U.S. patent application Ser. No. 09/715,585 entitled Fiber Management Frame for Closure filed Nov. 17, 2000 by Jennifer Battey, et al. and assigned to the assignee of the present application, the contents of which are hereby incorporated by reference in their entirety.

The fiber management frame 22 of the present invention may advantageously be utilized in various applications, including fiber-to-the-home and fiber-to-the-curb applications. As such, the configuration of the fiber management frame in each of these applications is hereinafter described with a more detailed explanation provided by U.S. patent application Ser. No. 09/715,585. In a fiber-to-the-home application, a fiber optic feeder cable extends through the closure 10 with one or more of the optical fibers of the fiber optic feeder cable being split from the fiber optic feeder cable and spliced or otherwise interconnected with corresponding optical fibers of one or more fiber optic drop cables. The fiber optic drop cables then exit the closure and extend to a home, business or the like.

In a fiber-to-the-home application as shown in FIG. 4, the optical fibers of the fiber optic feeder cable 80 enter the closure 10 through a respective port 18 defined by one end cap 16 and are split into two groups, the first group of the optical fibers being express fibers 82 that extend uninterrupted and unspliced through the closure. These express fibers extend through the first compartment 28 of the fiber management frame 22 and exit the closure through a respective port defined by the opposite end cap. The other optical fibers 84 of the fiber optic feeder cable that are split from the express fibers are directed to the second compartment 32.

In the fiber-to-the-home application, one or more coupler trays 50 are typically stored within the second compartment 32. In this regard, each coupler tray preferably defines an aperture through a medial portion thereof. As such, each coupler tray may be positioned within the second compartment such that the engagement member 48 of the second compartment extends through the aperture and engages the coupler tray. The optical fibers 84 of the fiber optic feeder cable 80 that have been split from the express fibers 82 are typically routed to the coupler tray. As known to those skilled in the art, optical fibers that are input into a coupler tray are split, typically two, three, four or more ways. Thus, a first optical fiber that enters a coupler tray is generally split into a plurality of second optical fibers. The optical fibers 86 emerging from the coupler tray are then routed to the third compartment 52. Once in the third compartment, the optical fibers preferably are looped one or more times therethrough in order to provide slack lengths of the optical fibers. The optical fibers then emerge from the third compartment and are routed to the fourth compartment 56 and into a tray 60.

In a fiber-to-the-home application, the closure 10 also receives the end portions of one or more fiber optic drop cables 88. The optical fibers 90 of the fiber optic drop cables are also directed to the third compartment 52 through which the optical fibers are looped one or more times in order to provide slack lengths of the optical fibers of the fiber optic drop cables. The optical fibers of the fiber optic drop cables then exit the third compartment and are directed to the fourth compartment 56. Once in the fourth compartment, the optical fibers of the fiber optic drop cable are directed into a tray 60 and are connected with corresponding optical fibers 86 from the coupler tray 50. As such, optical fibers 84 from the fiber optic feeder cable 80 can be interconnected with corresponding optical fibers 90 of a fiber optic drop cable 88. The fiber optic drop cable then exits the closure and extends to a home, business or the like.

In a fiber-to-the-curb application as shown in FIG. 5, the closure 10 not only receives a fiber optic feeder cable 80, but also receives an electrical feeder cable 92 having a plurality of electrical conductors 94, typically twisted wire pairs of copper conductors. The closure also receives the end portions of one or more drop cables 88. While separate drop cables could be utilized for both the optical fibers 90 and the electrical conductors 96, a common composite drop cable that includes both optical fibers and electrical conductors is typically utilized. Thus, at least some of the electrical conductors of the electrical feeder cable and at least some of the optical fibers of the fiber optic feeder cable can be spliced to corresponding electrical conductors and optical fibers of the composite drop cable. The composite drop cable can then extend from the curb to a home, business or the like.

In fiber-to-the-curb applications, the electrical conductors 94 of the electrical feeder cable 92 extend through the first compartment 28 of the fiber management frame 22. A number of the electrical conductors typically extend uninterrupted or unspliced through the first compartment. However, one or more of the electrical conductors are typically spliced to corresponding electrical conductors 96 of the drop cable 88. This splice is typically performed in the first compartment and in a manner known to those skilled in the art. In this application, the optical fibers of the fiber optic feeder cable 80 are again split with the express fibers 82 that extend uninterrupted through the closure 10 extending through the second compartment 32 of the fiber management frame 22. As such, in this application, the second compartment does not include the coupler tray 50, but instead, defines a passageway through which the express fibers of the fiber optic feeder cable extend. The optical fibers 84 of the fiber optic feeder cable that are split from the express fibers and are to be spliced to corresponding optical fibers 90 of the drop cable are routed directly to the third compartment 52. As described above in conjunction with the fiber-to-the-home application, the optical fibers are then looped through the third compartment to store slack lengths of the optical fibers prior to being directed to the fourth compartment 56 and into tray 60. Within the tray, the optical fibers of the fiber optic feeder cable are interconnected to corresponding optical fibers of a drop cable. As described above, the optical fibers of the drop cable are also preferably looped through the third compartment prior to being directed into the fourth compartment to provide slack lengths of the optical fibers.

In either application, the splicing or other optical fiber connection can be performed while the tray 60 is held by a splicing platform (not shown). Once the appropriate interconnections have been established, the splicing platform is stowed and the cover 37 of the first compartment 28 is installed. In this regard, the cover is typically connected to one or more of the upstanding flanges 36 of the first compartment so as to extend at least partially over the optical fibers or electrical conductors disposed within the first compartment, thereby protecting the optical fibers or the electrical conductors. Thereafter, the housing 12 may be assembled and the closure 10 placed into service.

As described above, various optical fibers are stored and routed by the fiber management frame 22 in both fiber-to-the-home and fiber-to-the-curb applications. While the optical fibers themselves can extend through the closure 10, the optical fibers are typically disposed in buffer tubes or transport tubes to further protect the optical fibers. Although not depicted in FIGS. 4 and 5, the optical fibers 84 of the fiber optic feeder cable 80 and the optical fibers 86 extending from the coupler tray 50 to the trays 60 are typically disposed in transport tubes, while the optical fibers 90 of the drop cables 88 are typically disposed in buffer tubes for added protection.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that further modifications and other embodiments are intended to be included within the scope of the appended claims. Although specific terms are employed herein, they are used in a generic and descriptive sense only and not for purposes of limitation.

That which is claimed is:

1. A fiber management frame for an interconnection closure comprising:
    a support defining a track;
    at least one upstanding bracket that engages the track defined by the support, the at least one upstanding bracket adapted to be slidably moved along the track so as to be repositioned relative to the support, wherein the at least one bracket comprises a pair of brackets adapted to be slidably moved toward and away from one another; and
at least one optical fiber connection tray positioned between the pair of brackets.

2. A fiber management frame according to claim 1 wherein the support defines a pair of lengthwise extending tracks that are parallel and that are spaced apart in the lengthwise direction, and wherein each bracket is adapted to be slidably moved along a respective track.

3. A fiber management frame according to claim 1 further comprising a locking member for securing the pair of brackets in position.

4. A fiber management frame according to claim 3 wherein each bracket comprises an arm that overlaps with the arm of the other bracket, and wherein the locking member comprises a fastener that engages the responder arms of the pair of brackets.

5. An interconnection closure comprising:
    a housing defining an internal cavity and a plurality of ports positioned on said housing and opening into the internal cavity for receiving a plurality of cables; and
    a fiber management frame disposed within the internal cavity defined by the housing, the fiber management frame comprising:
        a support; and
        at least one adjustable member cooperating with the support to define a space for securing at least one optical fiber connection tray selected from the group consisting of a splice tray, a coupler tray, and a connector panel, the at least one adjustable member capable of being repositioned relative to the support so as to correspondingly resize the space to receive various sizes of the at least one tray.

6. An interconnection closure according to claim 5 wherein the support defines a track, and wherein the at least one adjustable member comprises at least one upstanding bracket that engages the track defined by the support, the at least one upstanding bracket adapted to be slidably moved along the track so as to be repositioned relative to the support.

7. An interconnection closure according to claim 6 wherein the at least one bracket comprises a pair of brackets adapted to be slidably moved relative to one another.

8. An interconnection closure according to claim 7 wherein the support defines a pair of lengthwise extending tracks that are parallel and than are spaced apart in the lengthwise direction, and wherein each bracket is adapted to be slidably moved along a respective track.

9. An interconnection closure according to claim 7 wherein the fiber management frame further comprises a locking member for securing the pair of brackets to the support.

10. An interconnection closure according to claim 9 wherein each bracket comprises an arm that overlaps with the arm of the other bracket, and wherein the locking member comprises a fastener that engages the respective arms of the brackets.

11. An interconnection closure according to claim 6 wherein the support defines a slot that serves as the track, and wherein the at least one upstanding bracket extends through the slot and engages the support.

* * * * *